US012074902B2

(12) United States Patent
Coull et al.

(10) Patent No.: US 12,074,902 B2
(45) Date of Patent: *Aug. 27, 2024

(54) SYSTEM AND METHOD FOR CYBERSECURITY THREAT MONITORING USING DYNAMICALLY-UPDATED SEMANTIC GRAPHS

(71) Applicant: Google LLC, Mountain View, CA (US)

(72) Inventors: Scott Eric Coull, Cary, NC (US); Jeffrey Thomas Johns, Leesburg, VA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,785

(22) Filed: Jun. 20, 2023

(65) Prior Publication Data
US 2024/0007495 A1     Jan. 4, 2024

Related U.S. Application Data

(63) Continuation of application No. 17/549,147, filed on Dec. 13, 2021, now Pat. No. 11,729,204, which is a continuation of application No. 16/370,199, filed on Mar. 29, 2019, now Pat. No. 11,201,890.

(51) Int. Cl.
*H04L 9/40*      (2022.01)
*G06F 16/901*    (2019.01)

(52) U.S. Cl.
CPC ...... *H04L 63/1433* (2013.01); *G06F 16/9024* (2019.01); *H04L 63/1416* (2013.01)

(58) Field of Classification Search
CPC ............ H04L 63/1433; H04L 63/1416; G06F 16/9024; G06F 21/554; G06F 21/577
See application file for complete search history.

(56) References Cited

U.S. PATENT DOCUMENTS

| 8,813,236 | B1  | 8/2014  | Saha et al. |
| 9,930,059 | B1  | 3/2018  | Helmsen et al. |
| 10,560,351 | B1 | 2/2020  | Kaddoura |
| 11,201,890 | B1 | 7/2021  | Coull et al. |
| 11,729,204 | B1* | 8/2023 | Coull .................... G06F 21/554 |
| | | | 726/25 |
| 2018/0314834 | A1 | 11/2018 | Sander et al. |
| 2019/0260782 | A1 | 8/2019  | Humphrey et al. |
| 2019/0327260 | A1 | 10/2019 | Adamson et al. |
| 2021/0203686 | A1 | 12/2021 | Kazato et al. |

\* cited by examiner

*Primary Examiner* — Beemnet W Dada
(74) *Attorney, Agent, or Firm* — DORITY & MANNING P.A.

(57) ABSTRACT

A method for performing cyber-security analysis includes generating a semantic graph in which each object is represented as a node, and each event associated with an object is represented as an edge. A cyber-threat related alert, with an associated alert type, is received from a source. A first object from the plurality of objects is modified based on the alert. A plurality of threat scores, each associated with an object, are calculated, substantially concurrently, based on the alert type. Subsequently, a plurality of modified threat scores are determined for each object, based on: (1) the threat score for that object, (2) a connectivity of that object to each of the remaining objects within the semantic graph; and (3) the threat score for each remaining object from the plurality of objects. A subgraph of the semantic graph is identified based on normalized versions of the modified threat scores.

20 Claims, 13 Drawing Sheets

SYSTEM AND METHOD FOR CYBERSECURITY THREAT MONITORING USING DYNAMICALLY-UPDATED SEMANTIC GRAPHS

PRIORITY CLAIM

The present application is a Continuation of U.S. patent application Ser. No. 17/549,147, filed Dec. 13, 2021 and titled "System and Method for Cybersecurity Threat Monitoring Using Dynamically-Updated Semantic Graphs" which is a Continuation of U.S. patent application Ser. No. 16/370,199, filed Mar. 29, 2019 and titled "System and Method for Adaptive Graphical Depiction and Selective Remediation of Cybersecurity Threats," the contents of which are incorporated herein by reference in their entirety.

TECHNICAL FIELD

The present disclosure relates generally to the detection of cyber-threats, and more specifically, to systems for the aggregation and adaptive display of cyber-threat data and the selective remediation of cyber-threats.

BACKGROUND

Security operations center (SOC) analysts are tasked with observing vast volumes of alert data from cybersecurity software and hardware distributed throughout a protected network.

SUMMARY

Security operations centers can receive cyber-security-related alerts from any of a variety of sources constituting cyber-security devices and/or software (e.g., firewalls, malware protection systems, network security appliances, antivirus software, antispyware software, host intrusion prevention systems (HIPSs), monitoring agents, endpoints, third-party sources, etc.) and can be configured to monitor a network of interest using dedicated hardware and/or software to detect cyber-security threats. In some embodiments, a method employed by the SOC for performing cyber-security threat analysis and mitigation includes generating, via a compute device, a semantic graph in which each object from a plurality of objects is represented as a node, and each event (e.g., observed network traffic characteristic or monitored processing activity among monitored objects) from a plurality of events associated with the plurality of objects is represented as an edge. A signal representing an alert (e.g., report) is received from a source, the alert conveying information regarding an event and/or one or more objects relevant to a cyber-threat, and having an associated alert type. Based on the alert, at least a first object from the plurality of objects is modified (e.g., by incrementing an occurrence value related to the event reported by the alert). A plurality of threat scores, each associated with an object from the plurality of objects, are calculated, e.g., substantially concurrently, based on the alert type.

Subsequently, a plurality of modified threat scores are determined, for each object from the plurality of objects, based on: (1) the threat score for that object, (2) a connectivity of that object to each remaining object within the semantic graph; and (3) the threat score for each remaining object from the plurality of objects. The modified threat scores are normalized, and a subgraph of the semantic graph is identified based on the plurality of normalized threat scores. The subgraph is displayed within a graphical user interface (GUI) without displaying the remaining portion of the semantic graph, is visually highlighted while displaying both the subgraph and the remaining portion of the semantic graph, is presented in a separate window or display/display portion, or is otherwise brought to an analyst's attention, and may include, in some embodiments, a user-selectable feature to authorize remediation of the cyber-threat. In some embodiments, the semantic graphs are continuously updated, for example in response to detection, over time, of one or more new objects, one or more new events, and/or one or more newly received alerts.

Each object, represented by a node of the semantic graph, is a reference to a distinguishable programmatic entity (e.g., a network traffic packet, file residing on a computing device or a process running on a computing device), or a computing device itself such as an endpoint operating on network, etc., as monitored by a cyber-security device (or software). An event is a monitored feature, which may be an indicator of compromise, as logged by a cyber-security device. For example, an event may be a characteristic determined by static analysis (e.g., pattern matching) of data in flight (e.g., network traffic) or data at rest (e.g., stored files or other data), which may include malware. An event may also include information determined by dynamic analysis regarding a monitored processing or network activity, which may include indicators of a cyber-attack. Each edge of the semantic graph is related to an interaction between two objects, represented by a link between the respective nodes on the semantic graph. The interaction relationship between objects is based on information provided by received cyber-security alerts describing events monitored by the cyber-security devices (or software). For example, a user-operated endpoint may be monitored by resident cybersecurity software (e.g., an embedded agent), the software monitoring the execution of a process "opening" a file. The cybersecurity agent can alert the SOC, which can, in turn, construct at least a portion of the semantic graph by creating a "node" representing the process responsible for opening the file and a node representing the opened file. Similarly, the SOC links the generated nodes (representing the opened file and the process) by an edge of the semantic graph based on their interaction (i.e. the "open" action). Accordingly, the alert may be a signal reporting one or more events related to one or more objects, though in some cases an alert may additionally signal to warn of an actual or suspected cyber-threat, thus prompting further analysis or other action. Although in some embodiments set forth herein, the semantic graph is stored, maintained and/or modified at an SOC, alternatively or in addition, the semantic graph can be stored, maintained and/or modified, in other embodiments, at/by a cybersecurity agent (e.g., a local version of the semantic graph) and/or one or more further remote compute devices (e.g., a global version of the semantic graph, a copy of a local version of the semantic graph, etc.). Where multiple compute devices are used to store, maintain and/or modify a semantic graph, the multiple compute devices may be configured to operate in a peer-to-peer networked manner, for example such that reconstruction of the semantic graph involves at least a subset of the multiple compute devices.

In some embodiments, a method for performing cyber-security analysis includes generating a semantic graph in which each object from a plurality of objects is represented as a node, and each event from a plurality of events associated with the plurality of objects is represented as an edge. The method also includes sending a signal to cause display of the semantic graph via a GUI. Each edge from the plurality of edges can have an associated tally that actively updates in response to additional instances of the event associated with that edge. Event data for a compute device is logged, e.g., substantially in real time, and the semantic graph is updated, e.g., substantially concurrently with the logging of the event data, and based on the event data. The logging of the event data can be performed according to a predefined schedule. The updating of the semantic graph can include modifying an alert attribute of a first object from the plurality of objects when the event data includes an alert applicable to the first object, and modifying a threat score of each object from the plurality of objects based on the event data. The alert attribute optionally includes a timestamp associated with the alert. The updating of the semantic graph can also include decomposing the event data into a set of objects and a set of events, and updating a frequency of occurrence of an edge from the plurality of edges based on the set of events. A subgraph of the semantic graph can be detected/identified based on a plurality of normalized threat scores associated with the plurality of objects, and the subgraph can be displayed within the GUI without displaying the remainder of the semantic graph.

In some embodiments, a non-transitory processor-readable medium stores code representing instructions to cause a processor to generate a semantic graph representing a plurality of nodes and a plurality of edges, with each node from the plurality of nodes representing an object from a plurality of objects, and each edge from the plurality of edges representing an event from a plurality of events. The code also represents instructions to cause the processor to store alert data for a cyber-alert, where the alert data includes an associated alert type, an associated weight, and an associated number of occurrences. The code also represents instructions to cause the processor to calculate associations between each object from the plurality of objects and at least a portion of the alert data, and to calculate a plurality of threat scores for the plurality of objects based on the event data and the alert data. The instructions to cause the processor to calculate associations between each object from the plurality of objects and at least a portion of the alert data can include instructions to cause the processor to calculate a relevance of the cyber-alert to each object from the plurality of objects. The code also represents instructions to cause the processor to propagate the plurality of threat scores to at least a subset of the plurality of objects, based at least in part on the associations, identify a high-risk or anomalous subgraph of the semantic graph based on the plurality of threat scores, and send a signal to cause display of the subgraph within a GUI.

DETAILED DESCRIPTION

Figure 1:
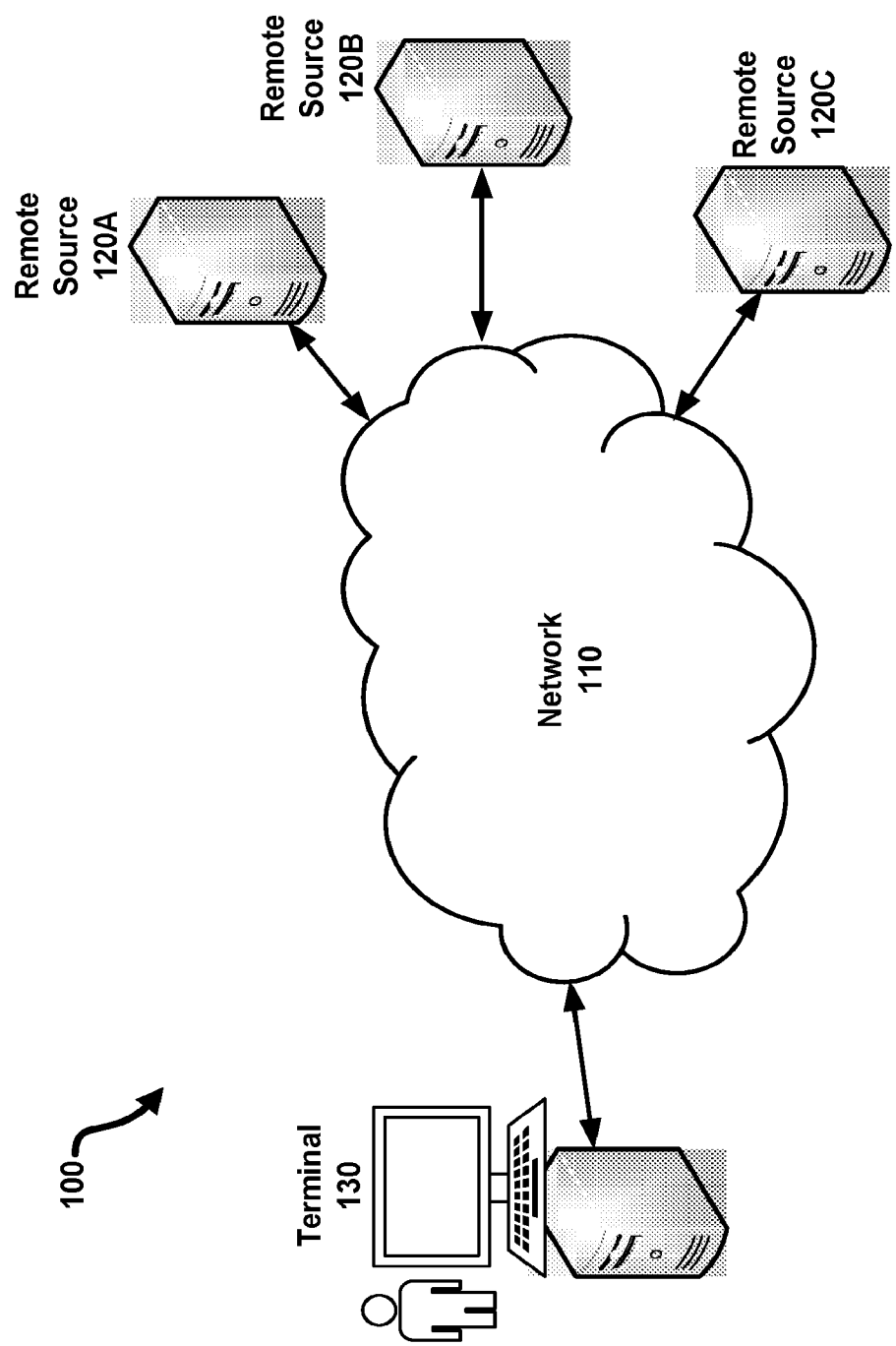
FIG. 1 is a diagram showing a networked system for performing cyber-security analysis and mitigation, according to an embodiment.

Some known cyber-security systems interfaces organize critical alerts, such as indicators of compromise (IOCs) into a global timeline or graph of associated alerts (e.g., within a "security operations center"). Such representations, however, are typically voluminous (e.g., requiring an analyst to scroll through many pages), and can include benign and/or duplicative information, making it cumbersome/difficult for an expert or analyst to readily discern/detect significant cyber-security threats. Without the ability to readily discern a cyber-security threat, the analyst often cannot timely mitigate or remediate that threat. Systems and methods of the present disclosure address the foregoing shortcomings by generating and dynamically updating a semantic graph and automatically propagating changes to threat scores (e.g., in response to newly-detected alerts) within the semantic graph, providing a more concise and efficient representation of the overall cyber-security condition of a system or network. Moreover, systems and methods described herein facilitate the identification of subgroups of interest (i.e., subgraphs within the semantic graph) such that only the subgroup(s) are displayed to an analyst, or such that an analyst's attention is otherwise directed to a region of interest (e.g., represented by the subgraph within the semantic graph), thereby achieving the practical benefits of reducing processor and/or storage requirements, improving processor efficiency, increasing the data value and/or relevance for a given region of observation (i.e., a network or portion of a network that is being monitored for cyber-security by an analyst), and/or improving the analyst's response time.

As used herein, a "semantic graph" refers to any representation of semantic relationships between networked elements, and can include, for example, one or more abstract semantic graphs (ASGs) such as directed graphs (e.g., directed acyclic graphs (DAGs)), undirected graphs, and/or hypergraphs. As used herein, an "alert" can be associated with or triggered by any of a variety of computing activities, for example, one or more of the following: an unauthorized wireless connection, an application installed on a locked down system, a removable drive added to a locked down system, a granting or denial of administrative rights or escalation of privileges, an unauthorized access of an access-restricted compute device, detection of a new device on a restricted network, multiple different user login(s) made by a single compute device, a failure to enforce an internet restriction, a circumvention of a network restriction, a failure to timely install a critical patch or software update, detection of a new user or new user-profile creation, an unexpected/unusual login of a user, an unusual login time of a user, detection of an internal vulnerability, etc.

In some embodiments, the visual/graphical representation of the semantic graph includes one or more user-selectable features (e.g., buttons, sliders, swipable regions, checkboxes, dialog boxes, dropdown menus, or any other graphical elements with which a user can interact via the GUI), the user selection/actuation of which can authorize remediation of the cyber-threat (i.e., remediation options). Such user-selectable features can be positioned adjacent to a particular node or edge (associated with a detected cyber-threat) within the semantic graph, and/or can be specific to an alert and therefore positioned anywhere within the GUI, as the remediation of the alert can impact multiple nodes and/or edges of the semantic graph. In some such implementations, all impacted nodes and edges of the semantic graph are highlighted or otherwise made graphically prominent in response to the display and/or selection of a remediation option. In some embodiments, the semantic graph is continuously updated, for example in response to detection, over time, of one or more new objects, one or more new events, and/or one or more new alerts.

FIG. 1 is a diagram showing a networked system for performing cyber-security analysis and mitigation, according to an embodiment. As shown in FIG. 1, the system 100 includes a network 110 providing wired or wireless communications connectivity between a plurality of remote sources 120A-120C, and a terminal 130 (with an optional user, who may be an administrator). Each of the remote sources 120A-120C and the terminal 130 can be a compute device including a processor and a memory in operable communication with the processor. Each memory can store instructions, executable by the processor, to perform specified functions. The instructions can be implemented in software (e.g., software modules stored in memory) and/or hardware. In particular, the memory at terminal 130 can store instructions to cause the processor of terminal 130 to generate a graphical representation of cyber-threat and/or cyber-security related data thereon (e.g., via a graphical user interface (GUI) on a display of the terminal 130), and to update the graphical representation based on signals, originating at one or more of the remote sources 120A-120C (also referred to herein as "sources") and received at the terminal 130 via the network 110, each of the signals representing one or more alerts. The signals can also represent, and/or additional signals can be received at the terminal 130 and represent, meta-information associated with the one or more alerts. The meta-information can include, for example, information about a source of the alert, an indication as to whether the alert resulted from the processing of code received by the terminal 130 (e.g., via email), a code signature associated with the alert, or any other suitable type of meta-information associated with the alert. The graphical representation can include a semantic graph having a plurality of "nodes" that are interconnected by "edges." In other words, the edges can be viewed as representing relationships between nodes. Each of the nodes can represent and/or be associated with an object, and each of the edges can represent and/or be associated with an event. The impact any given received alert has on the graphical representation can depend on an alert type of the alert. The "alert type" is a classification of the alert, and has an associated credibility value (or quality value). The credibility value can be calculated/determined by the terminal 130, for example based on one or more of: historical data including observed analyst responses to previous alerts received from that source, historical data for alerts received from that source indicating, for those alerts, whether the alert coincided with or accurately predicted a bona fide cyber-threat, third-party data (e.g., external threat intelligence data) assessing the credibility/reputation of that source, etc. Alternatively or in addition to a credibility value, the alert type can refer to a granularity of the associated alert or to a prevalence of the alert within a monitored population (e.g., less prevalent alerts may be considered more important or useful than higher-prevalence alerts). For example, a low-detail alert type can be: a general change in permissions or configuration of a network, whereas a high-detail alert type for the same event triggering the alert can include details such as the permission settings, user identifier(s), the time of the change, a network identifier, etc.

In some embodiments, the terminal 130 performs updates to the semantic graph via propagation and scoring. As used herein, "propagation" refers to taking the entire value of, or a fraction of the value of, a given node's threat score, and using the entire or fractional value of that node's threat score to modify all other nodes in the semantic graph (e.g., substantially concurrently or simultaneously) as the other nodes are encountered during iterative traversals (i.e., paths) of the semantic graph along edges. The paths can be selected, for example, based on the associated time to traverse, attributes of nodes along the paths, and/or attributes of the edges (e.g., frequencies of occurrence of the edges (e.g., more frequently-occurring edges can have a higher probability of being followed), edge directionality, interaction type (e.g., a read event or a write event), etc.). Since edges and/or objects can be added over time in response to additional signals received at terminal 130, a new path determination can be performed for each iteration, and may change from iteration to iteration, depending on how the semantic graph evolves. As used herein, "scoring" refers to the process of taking the threat score information propagated through a given node, and combining (e.g., substantially concurrently or simultaneously) that threat score information with threat score information at each of the other nodes, to derive a final threat score for that node. Scoring can occur subsequent to (and optionally immediately subsequent to) propagation. The propagation and scoring mechanisms can be performed using a class of algorithms that can be referred to as belief propagation algorithms, which are message-passing algorithms for performing inference on graphical models by calculating the marginal distribution of each unobserved node, conditional on any observed nodes. The belief propagation algorithm used can be an exact method (e.g., sum-product message passing) or an approximate method (e.g., variational message passing).

Figure 2:
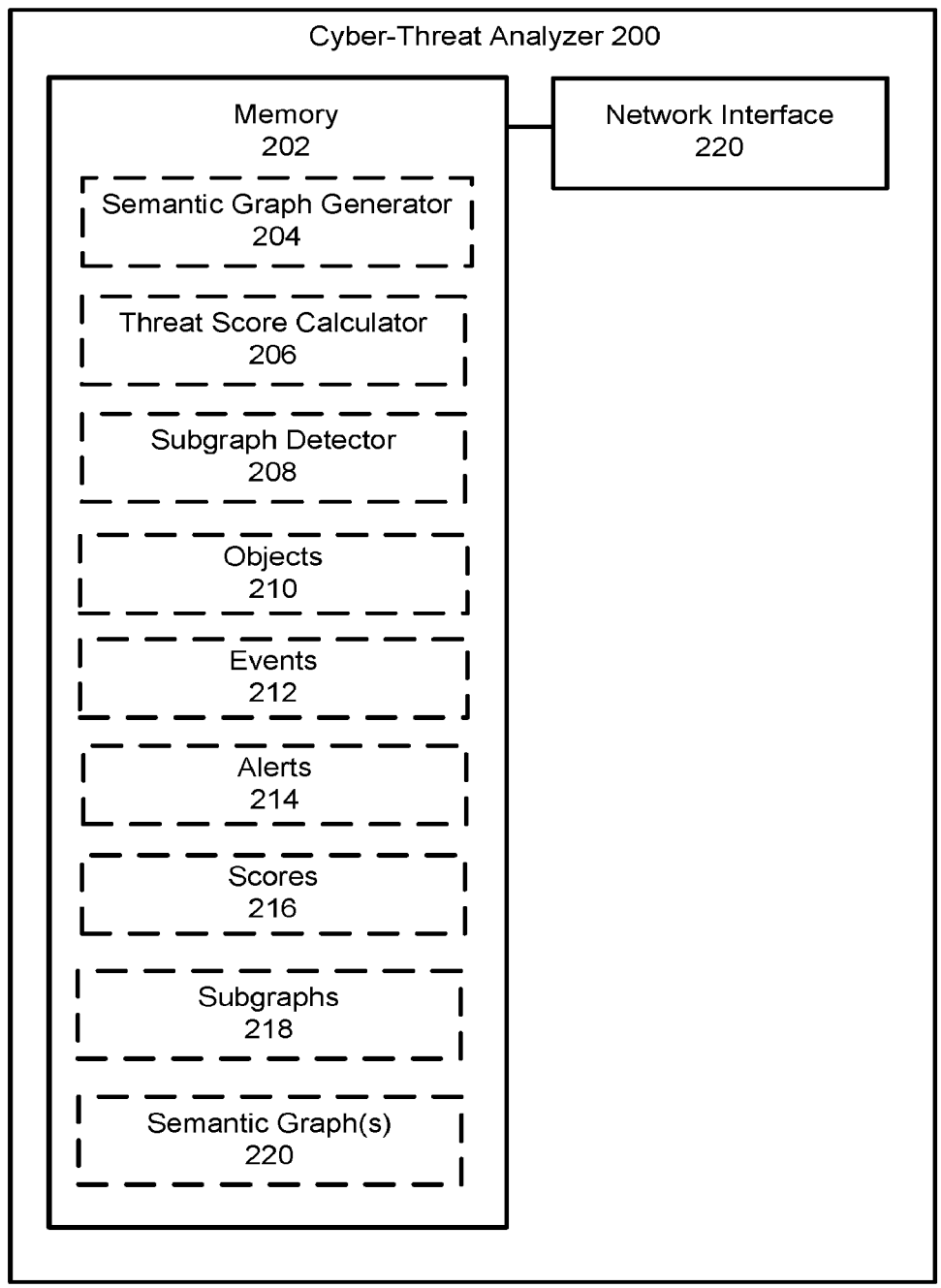
FIG. 2 is a diagram showing components of a cyber-threat analyzer, according to an embodiment.

FIG. 2 is a diagram showing components of a cyber-threat analyzer, according to an embodiment. The cyber-threat analyzer 200 of FIG. 2 can be implemented at, for example, the terminal 130 of FIG. 1. The cyber-threat analyzer 200 (e.g., a server, a public cloud (e.g., accessible via the internet), a private cloud (e.g., accessible over a private connection, e.g., a virtual private network (VPN)), a peer-to-peer computing system, etc.) includes a memory 202 operably coupled to a network interface 220 equipped to receive and/or send signals representing messages from a network. The memory 202 includes one or more modules (e.g., software modules stored in the memory), including one or more of: a semantic graph generator 204, a threat score calculator 206, and a subgraph detector 208. The memory 202 also stores (e.g., in a database) data for one or more of: objects 210, events 212, alerts 214, scores 216, subgraphs 218, and semantic graph(s) 219. During operation of the cyber-threat analyzer 200, the semantic graph generator 204 can generate a data representation of a semantic graph that includes multiple nodes representing objects 210 and multiple edges representing events 212. Alternatively, the cyber-threat analyzer 200 can send relevant object, event and/or alert data to a remotely coupled network service or device to generate of the semantic graph (e.g., to reduce resource consumption at the cyber-threat analyzer 200 itself). The generation of the semantic graph (whether by the semantic graph generator 204 or by the remotely coupled network service or device) can be based on all objects and/or events associated with a particular network or set of networks of interest (e.g., for a given observation period), such that the semantic graph includes nodes and edges for all objects and/or events. Alternatively, in some implementations or instances, the generation of the semantic graph (whether by the semantic graph generator 204 or by the remotely coupled network service or device) can be based on a subset of all objects and/or events associated with a particular networks or set of networks of interest, such that the semantic graph includes nodes and edges for the subset of objects and/or events. The cyber-threat analyzer 200 can receive, via the network interface 220 and from one or more remote sources (e.g., 120A-120C of FIG. 1), signals representing one or more new objects 210 and/or events 212 that have been detected within a networked system (e.g., networked system 100 of FIG. 1). The remote sources 120A-120C can include, for example, endpoint cyber-security agents, network security appliances, firewalls, etc. Data associated with the one or more new objects 210 and/or data associated with the one or more new events 212 can be stored in the memory 202. Alternatively or in addition, the cyber-threat analyzer 200 can receive, via the network interface 220 and from one or more remote sources (e.g., 120A-120C of FIG. 1), signals representing one or more alerts 214 associated with a cyber-threat or cyber-security related incident. The alerts can be generated, for example, at the one or more remote sources and/or at one or more remote/third-party compute devices. The cyber-threat or cyber-security related incident can include an incident that impacts the operability, functionality, or security of hardware and/or software of the one or more remote sources. Data associated with the one or more alerts 214 (i.e., alert data) can include an alert type, an associated weight, a timestamp and/or a number of occurrences of the one or more alerts 214, and can be stored in the memory 202.

In response to receiving the one or more alerts 214, the threat score calculator 206 can calculate multiple threat scores 216 based on the alert data (e.g., the alert type(s)), each threat score from the multiple threat scores being associated with an object 210 from the multiple objects. Once the multiple threat scores have been calculated, the threat score calculator 206 can then calculate modified threat scores for each object 210 in the semantic graph (e.g., substantially concurrently/simultaneously), such that the multiple threat scores are propagated throughout the semantic graph. Optionally, the threat score calculator 206 also normalizes the modified threat scores prior to subgraph detection. The subgraph detector 208 can then identify one or more subgraphs of the semantic graphs, based on the (optionally normalized) modified threat scores, as shown and further discussed herein with reference to FIGS. 7A-7I. For example, the one or more subgraphs can be selected by the subgraph detector as having a locally higher average threat score than a remainder of the semantic graph. The subgraph(s) can then be displayed (e.g., via a GUI of the cyber-threat analyzer 200, not shown). Alternatively or in addition, reports can be generated based on the subgraphs, optionally including recommended mitigations based on experiential knowledge of the system, a set of pre-defined mitigations, and/or other past mitigations.

Figure 3:
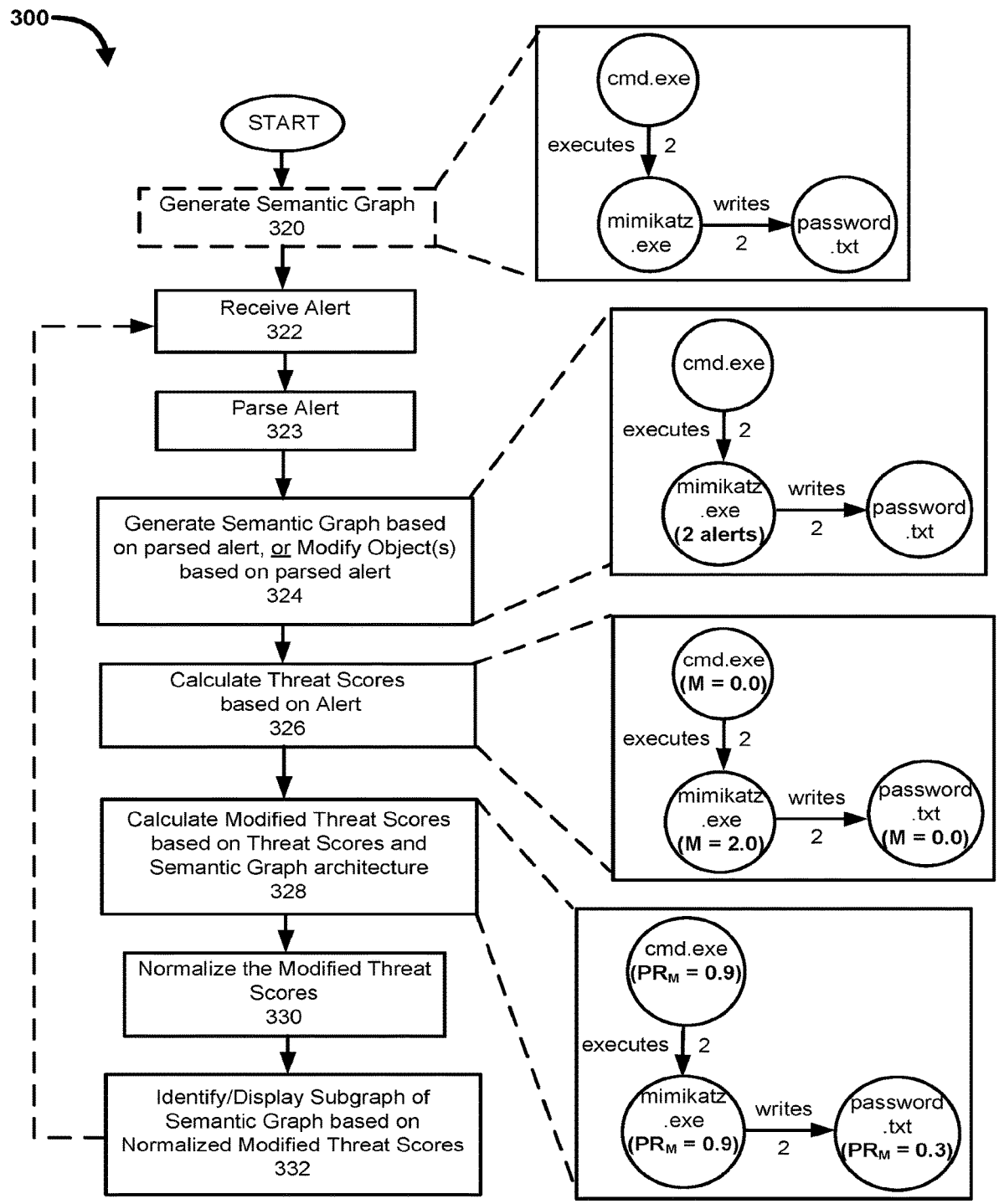
FIG. 3 is a flowchart showing a method of analyzing and mitigating cyber-threats, according to an embodiment.

FIG. 3 is a flowchart showing a processor-implemented method of analyzing and mitigating cyber-threats, according to an embodiment. As shown in FIG. 3, the method 300 begins with an optional generation at 320, of an initial/starting semantic graph (e.g., via a semantic graph generator 204 of FIG. 2), an example excerpt of which is also provided in FIG. 3 towards the right. The example excerpt of the initial semantic graph, shown in FIG. 3, includes objects "cmd.exe," "mimikatz.exe," and "password.txt," represented as nodes, and events "executes" and "writes," represented as edges (i.e., lines of connection/connectivity between the objects). Each event/edge, in addition to an annotation showing the name of that event, also includes an annotation showing a frequency of occurrence (i.e., a number of occurrences) for that edge. In other words, the "executes" event has occurred twice (as of the time of observation of the example excerpt of the initial semantic graph), and the "writes" event has occurred twice. The example semantic graph in FIG. 3 represents real observations that the cmd.exe program executed twice, which caused (as represented by the arrow directionality) the mimikatz.exe program to write twice, as separate events, to password.txt. As can be inferred from FIG. 3, as the semantic graph is modified (during operation of the processor (e.g., cyber-threat analyzer 200 of FIG. 2)), at least some of the nodes and edges (with annotations) rendered within a GUI can remain graphically stationary (i.e., maintain their spatial positions within a display region) while the occurrence value(s) are increased/incremented as new event data is received/logged. Representing modifications to the semantic graph in this manner reduces processing complexity and makes it easier for a user to visually monitor a relatively large volume of data of the semantic graph within a compact representation, and to more readily detect important changes and/or anomalies therein.

At 322, an alert is received (or multiple alerts are received) at the processor. The alert can be associated with and/or triggered by, for example, a cyber-threat or cyber-security risk that has been detected within a networked system operably coupled to the processor. At 323, the alert is parsed. After parsing the alert, and in response to receiving the alert, at 324, the processor either generates a semantic graph based on the parsed alert (e.g., if no semantic graph was generated at 320), or modifies (i.e., adds or changes, e.g., via a semantic graph generator 204 of FIG. 2) one or more objects of the semantic graph based on the alert (i.e., thereby producing a modified semantic graph), for example such that that object includes an attribute associated with the alert (i.e., an alert attribute). The alert attribute can include a timestamp associated with the alert. An example excerpt of the semantic graph after modification of the one or more objects is provided in FIG. 3. The example excerpt of the modified semantic graph shows that the "mimikatz.exe" object/node has been annotated to include the text "2 alerts." Such a modification to the semantic graph can indicate that two alerts associated with the mimikatz.exe executable software application have been received, and can be accompanied by the storage, in a memory operably coupled to the processor, of a relationship between the "mimikatz.exe" object/node and alert data associated with the alert. Also in response to receiving the alert, the processor calculates, at 326, threat scores, based on the alert, for each of the objects in the semantic graph. The calculation of the threat scores for each of the objects can be performed simultaneously/concurrently, substantially simultaneously/concurrently, or overlapping in time, or can follow a sequencing according to a pre-specified schedule or algorithm. In some embodiments, calculating the threat scores is performed according to the following equation:

$$M_x = \sum_{i \in alerts} w_i n_i$$

where $M_x$ is the threat score for node x, $w_i$ is a weight of alert type i, and $n_i$ is a number of times the alert type has occurred with respect to the modified first object (denoted as x) and within a current analysis/monitoring period (or "epoch"). The weight for the alert type can be based on a quality of the alert type and/or the source from which the alert was received. An example excerpt of the semantic graph after calculation of the threat scores is provided in FIG. 3. As shown in the excerpt, each of objects/nodes "cmd.exe," "mimikatz.exe," and "password.txt" is annotated with an associated threat score (also referred to herein as a "maliciousness score"—"M"): "M=0.0," "M=2.0," and "M=0.0," respectively. In some embodiments, the threat score is associated with suspicious and/or unusual communication between an endpoint and another endpoint within the network (e.g., following generation of a file by execution of a process on the monitored endpoint(s)).

Once the threat scores are calculated at 326, each threat score associated with a given object/node (i.e., initial/starting threat scores) is "propagated" to each of the other objects/nodes of the semantic graph through the calculation, at 328, of modified threat scores. Each of the modified threat scores (for each of the other objects/nodes of the semantic graph) can be calculated based on the initial/starting threat score of that object/node, an architectural property of the semantic graph, and/or the threat score for each remaining object from the plurality of objects, e.g., using an algorithm including at least one of: PageRank, Hyperlink-Induced Topic Search (HITS), diffusion wavelet analysis, a sum-product message passing algorithm, or a variational message passing method/algorithm. The architectural property of the semantic graph may include one or more of (but is not limited to): a centrality, a connectivity, a confidence, and a distance associated with that object/node, e.g., relative to one or more other objects/nodes of the semantic graph, as applicable. Alternatively, or in addition, the modified threat scores can be based on a maliciousness (i.e., threat score) of one or more other objects/nodes in the semantic graph (e.g., a predetermined number of nearest neighbors). The calculation of the modified threat scores for each of the objects can be performed simultaneously/concurrently or substantially simultaneously/concurrently, or can follow a sequencing according to a pre-specified schedule or algorithm. Determining the modified threat scores can be performed at a predetermined time, for example after at least one of: a specified number of alerts have been received, or a specified interval of time has elapsed. In some embodiments, calculation of the modified threat scores is performed according to the following equation (solved separately for each of the objects):

$$\frac{\text{Relevance} - BR}{BR}$$

where BR is a baseline rank (also referred to herein as a "baseline threat score," i.e., for a previous instance of the semantic graph, e.g., during a previous analysis/monitoring period or "epoch") for that object and Relevance is a current relevance (also referred to herein as a "current threat score," e.g., associated with a current analysis/monitoring period or "epoch") for that object. An example excerpt of the semantic graph after calculation of the modified threat scores is provided in FIG. 3. As shown in the excerpt, each of objects/nodes "cmd.exe," "mimikatz.exe," and "password.txt" is annotated with an associated modified threat score (in this case, a personalized Page Rank score: "$PR_M$"): "$PR_M=0.9$," "$PR_M=0.9$," and "$PR_M=0.3$," respectively.

The modified threat scores are normalized (e.g., to a sum of 1) at 330, and a subgraph of the semantic graph is identified, at 332, based on the plurality of normalized threat scores. The subgraph can be displayed within a graphical user interface (GUI) without displaying the remaining portion of the semantic graph, or the subgraph can otherwise be brought to an analyst's attention (e.g., via the presentation of an alert within the GUI and/or a modification to the relative proportion of graphical representations of portions of the semantic graph within the GUI, etc.). The subgraph can include one or more user-selectable features to authorize and/or initiate/cause remediation of the cyber-threat. Examples of remediation can include, but are not limited to: ceasing/stopping execution of a software application, deleting a file, quarantining a host, changing a firewall rule, blocking a user from accessing one or more computing resources (e.g., by modifying a permission setting or credential associated with the user), installing an update to a software application, etc. In some embodiments, the remediation is executed by the processor itself (e.g., cyber-threat analyzer 200 of FIG. 2). In some embodiments, the semantic graph is continuously updated (e.g., as indicated by the dashed arrow of FIG. 3 that loops from 332 to 320), for example in response to detection, over time, of one or more new objects, one or more new events, and/or one or more new alerts.

In some embodiments, a sub-graph is further analyzed by the processor (e.g., cyber-threat analyzer 200 of FIG. 2) based on a pattern of communication identified as a "malicious lateral movement," and a set of relevant mitigations may be associated with the subgraph, such that the subgraph and the associated mitigations are then presented to an analyst for action. The mitigations presented to the analyst may be based, for example, on a set of defined mitigations associated with known subgraphs, a set of past mitigations previously implemented by a user or by the analyst for the same or a similar subgraph or malicious behavior, and/or dynamically generated mitigations.

In some embodiments, weightings are periodically or aperiodically generated for, and associated with, a semantic graph. The weightings can be generated based on a known confidence of maliciousness (e.g., based on historical data associated with a detected malicious behavior). Alternatively or in addition, the weightings can be based on a temporal relationship between the triggering/malicious event and events of known maliciousness. Systems set forth herein can be operated within a protected network and/or via the use of a remote, network-coupled service.

Figure 4:
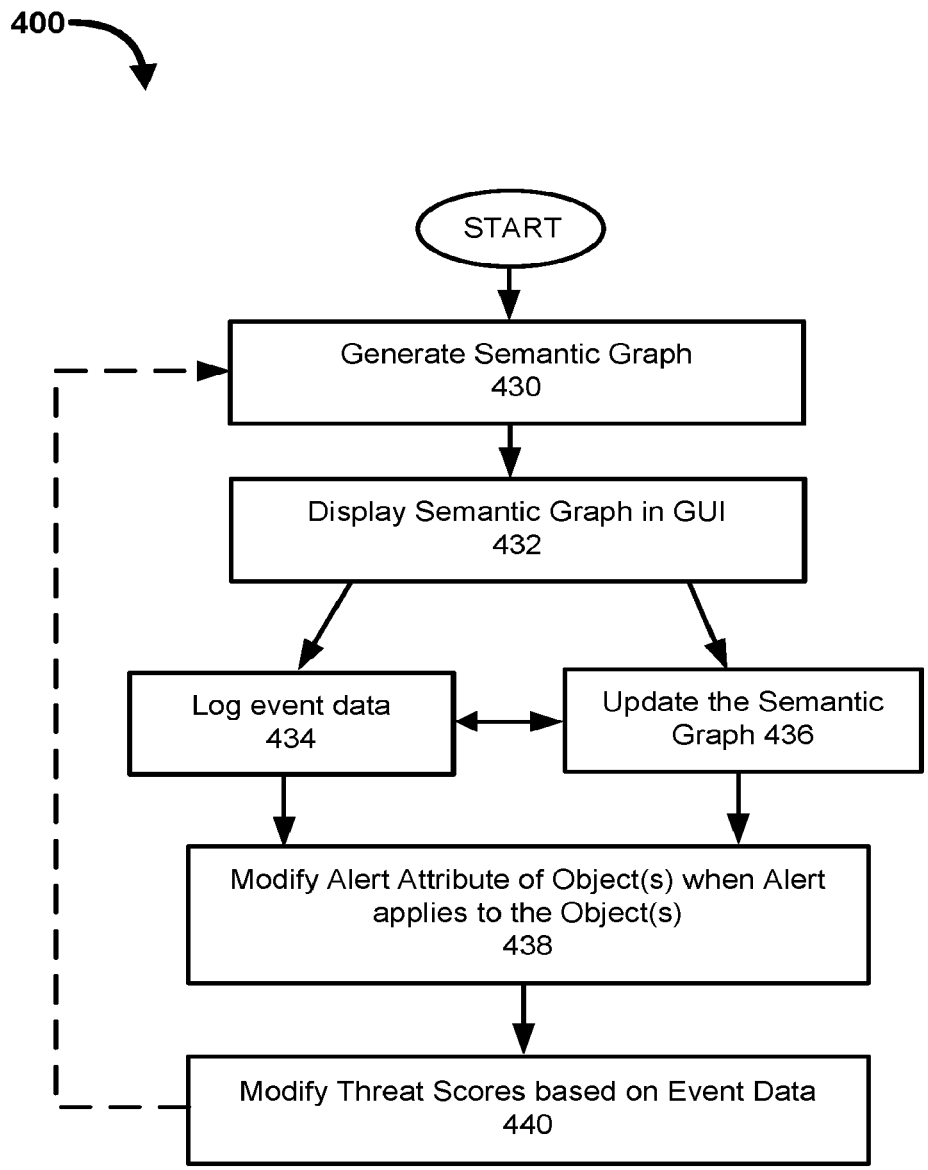
FIG. 4 is a flowchart showing a method of analyzing cyber-threats, according to an embodiment.

FIG. 4 is a flowchart showing a processor-implemented method of analyzing cyber-threats, according to an embodiment. The method 400 of FIG. 4 includes some steps common/similar to the method 300 of FIG. 3, but includes an event logging capability. As shown in FIG. 4, the method 400 includes generating, at 430, and displaying, at 432, a semantic graph for a networked system that is being monitored for cybersecurity. The method 400 also includes, at 434, logging event data, and at 436, updating the semantic graph (e.g., based on the logged event data at 434). The updating the semantic graph can include decomposing the logged event data into a set of objects and a set of events. The logging of the event data 434 and the updating of the semantic graph 436 can be performed in parallel, or can at least partially overlap in time. The event data can include one or more alerts. At 438, when an alert is received (e.g., as part of the event data logging 434) that is applicable to one or more objects/nodes of the semantic graph, an alert attribute of the one or more objects/nodes is modified. At 440, the threat scores of the semantic graph are modified (e.g., simultaneously or substantially simultaneously) based on the event data that has been logged at 434. In some implementations of the method 400, the method iterates by looping back to the generate semantic graph 430 step (e.g., to generate a modified semantic graph that includes the modified threat scores calculated at 440).

Figure 5:
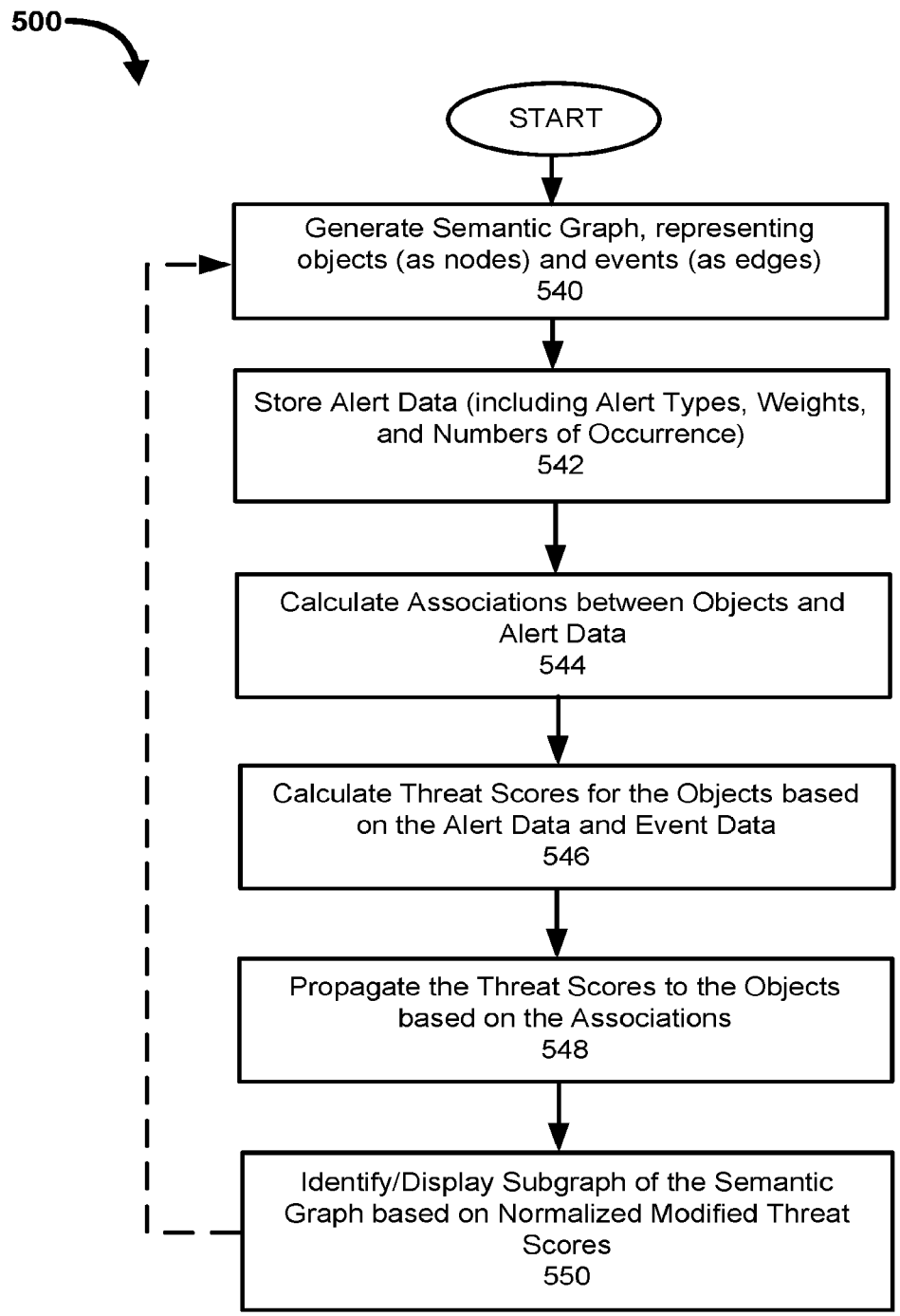
FIG. 5 is a flowchart showing a method of analyzing cyber-threats, according to an embodiment.

FIG. 5 is a flowchart showing a processor-implemented method of analyzing cyber-threats, according to an embodiment. As with the method 300 of FIG. 3, the method 500 of FIG. 5 includes the identification of a subgraph of the semantic graph, but also includes the calculation of associations between objects and alert data. As shown in FIG. 5, the method 500 includes generating, at 540, a semantic graph that represents objects as nodes and events (or actions) as edges. Alert data (e.g., for one or more cyber-alerts received at the processor from one or more firewalls, agents, third-party sources, etc.) is stored in memory at 542. The alert data can include one or more of: alert type, weight, and number of occurrences. At 544 (optionally in response to or triggered by the receipt of the alert(s)), associations between objects of the semantic graph and the alert data are calculated. Threat scores for the objects of the semantic graph are then calculated (e.g., simultaneously or concurrently), at 546, based on the alert data and the event data. At 548, each threat score calculated at 546 for a given object/node of the semantic graph is propagated to each other object/node of the semantic graph, via the calculation of modified threat scores that are based on the associations calculated at 544. A subgraph (e.g., a high-risk or anomalous subgraph) of the semantic graph can then be identified/detected (and optionally displayed via a GUI) at 550 based on the modified threat scores (which have optionally been normalized prior to the subgraph detection). A high-risk or anomalous subgraph can refer to a portion of the semantic graph (e.g., a subset of nodes from the multiple nodes of the semantic graph) having one or more associated threat scores and/or an associated threat score statistic (e.g., an average threat score for the subset) that is higher than a predefined/specified threshold and/or that is higher than a corresponding property of the remainder of the semantic graph.

In some embodiments, the alert is a first alert, and the method 500 also includes calculating an updated plurality of threat scores for the plurality of objects based on a second alert, and propagating the updated plurality of threat scores to at least the subset of the plurality of objects of the semantic graph. Calculating the updated plurality of threat scores can include calculating associations between each object from the plurality of objects and data associated with the second alert (optionally including calculating a relevance of the one or more cyber-alerts to each object from the plurality of objects), and to calculate the updated plurality of threat scores based on the associations between each object from the plurality of objects and data associated with the second alert.

In some embodiments, the event data is a first event data, and the method 500 also includes receiving a second event data after receiving the first event data, incrementing a number of occurrences associated with at least one event from the plurality of events to produce an incremented number of occurrences, and sending a signal, in response to incrementing the stored number of occurrences, to cause display of a modified subgraph including the incremented number of occurrences within the GUI.

Figure 6:
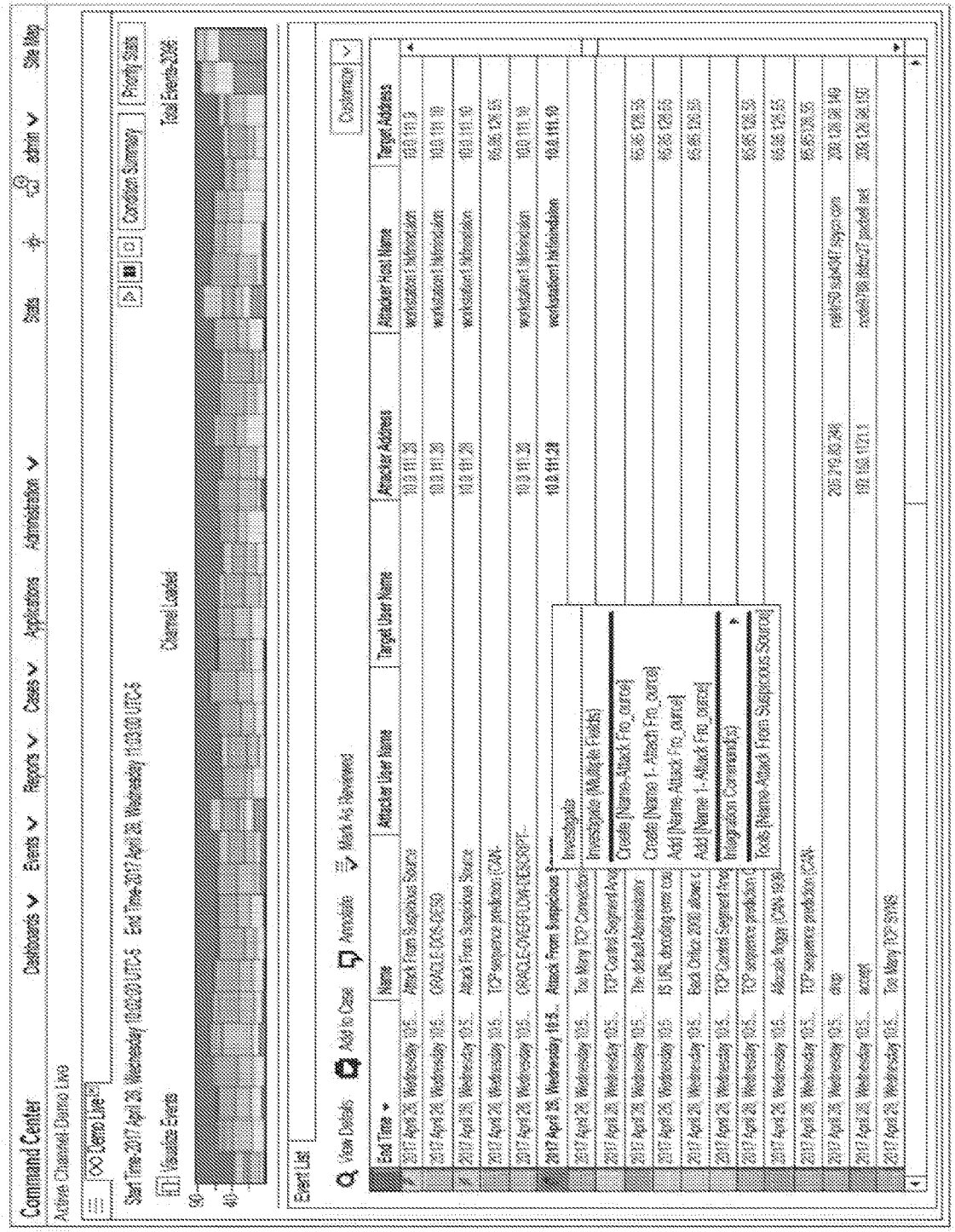
FIG. 6 shows an example of a known security operations center interface.

FIG. 6 shows an example of a known security operations center interface. As discussed above, the presentation and constant updating of a large volume of event and alert data in a scrolling/scrollable list, such as that of FIG. 6, makes it cumbersome/difficult for an analyst to maintain a global picture of the cyber health of the system being monitored (e.g., because the topmost item in the scrolling list is the most recent, but may not be the most relevant), much less to readily discern cybersecurity threats.

Figure 7A:
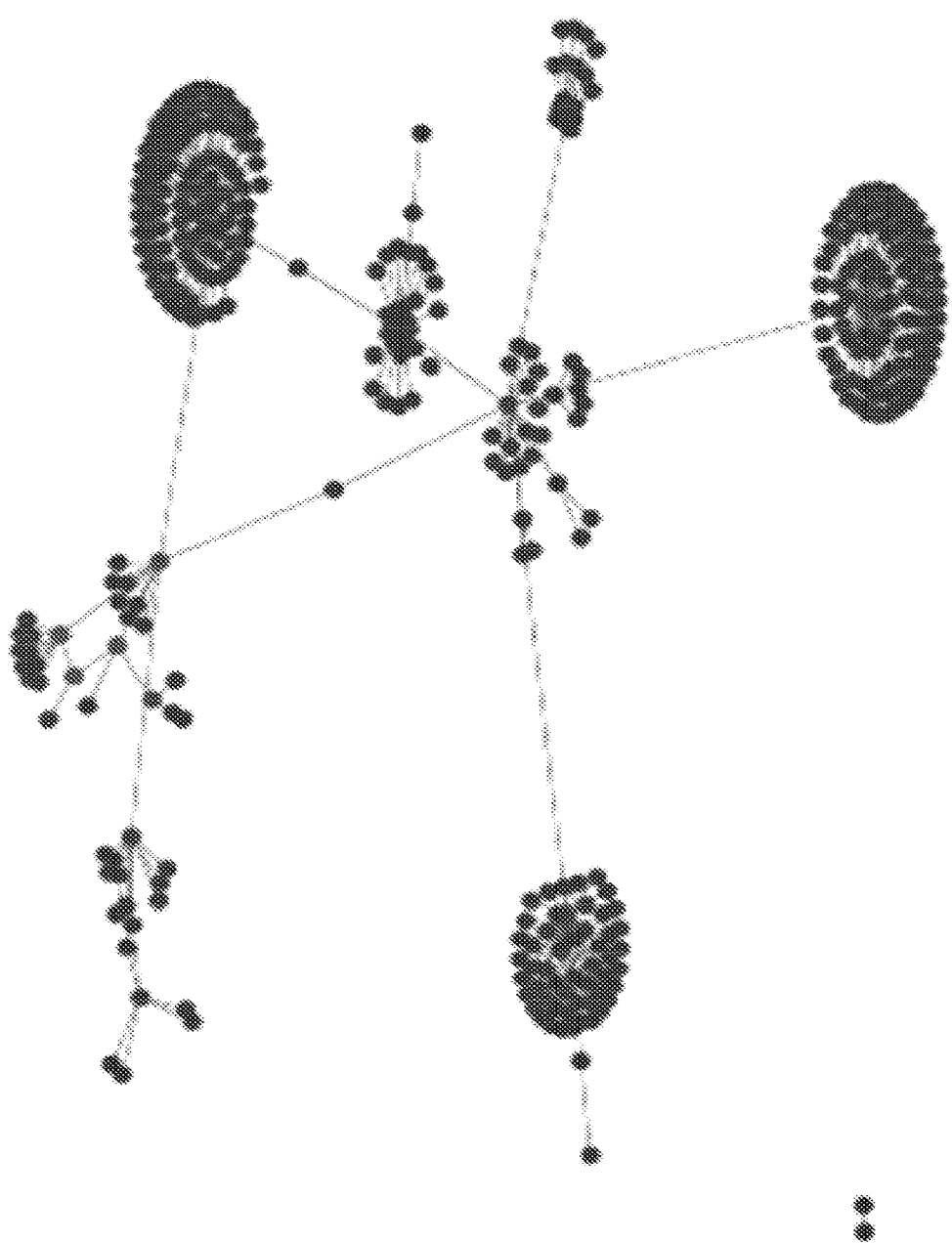
FIG. 7A shows an example of a semantic graph, according to an embodiment.

FIG. 7A shows an example of a semantic graph, according to an embodiment. In contrast with the known interface of FIG. 6, the semantic graph of FIG. 7A presents network-wide cybersecurity data within a single view that includes annotated nodes and edges (as described herein) and that can be wholly presented and maintained within a GUI display window (and optionally zoomed into for greater detail, as desired), without the need for scrolling within the interface, or tallying listed events. The semantic graph shown in FIG. 7A includes 377 nodes and 379 edges. In some embodiments, when a subgraph is identified, a display of the subgraph within the GUI (optionally without the remainder of the semantic graph) is triggered. Alternatively or in addition, when a subgraph is detected, an alert is presented to the analyst via the GUI (optionally including an interactive object via which the analyst can elect to view the subgraph and/or cause remedial action to be initiated).

Figure 7B:
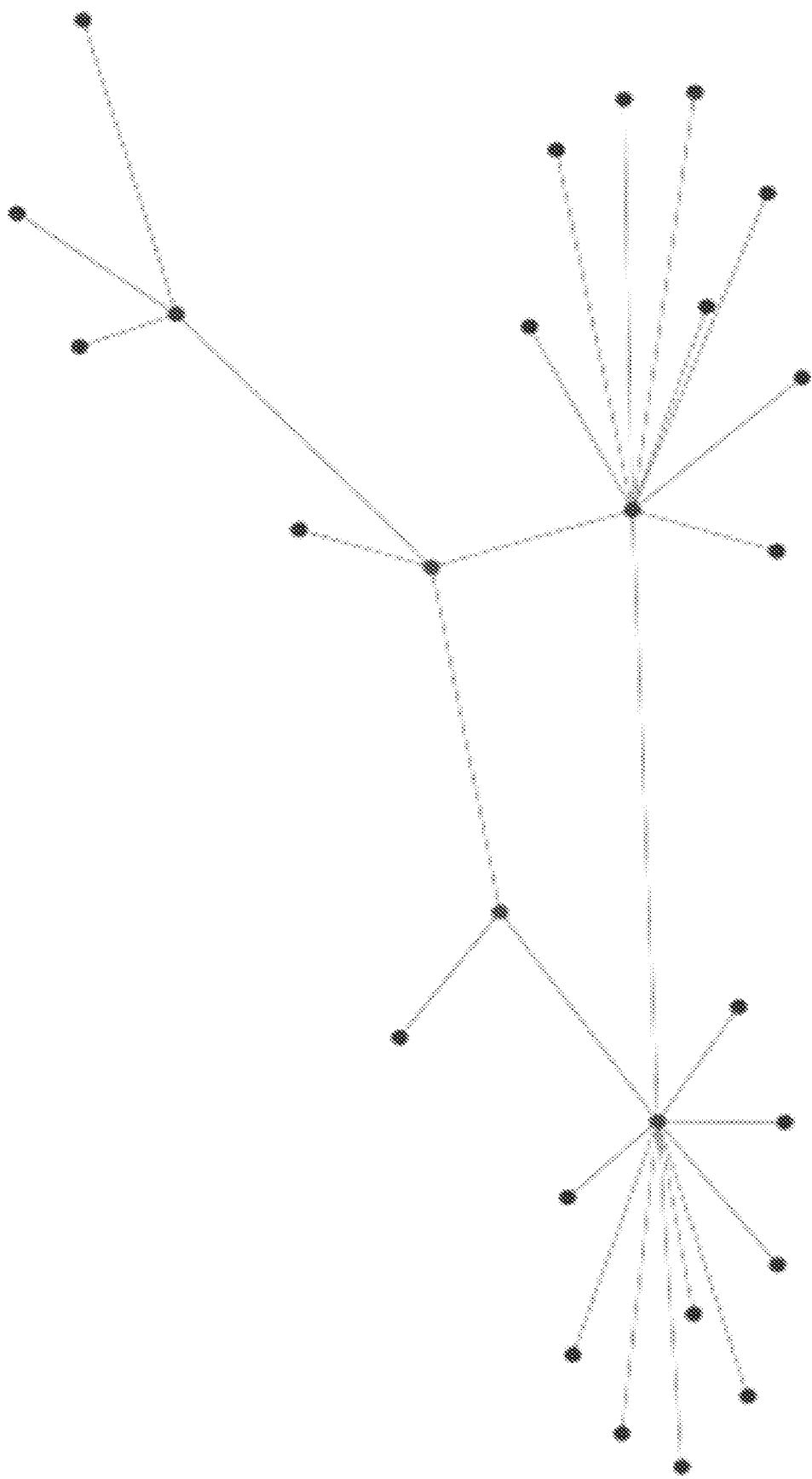
FIG. 7B shows an example subgraph of the semantic graph of FIG. 7A.
Figure 7C:
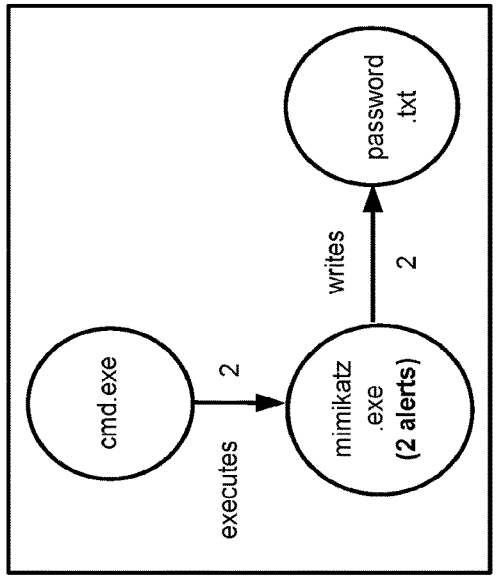
FIGS. 7C-7F are diagrams showing an evolution of an excerpt of the semantic graph of FIG. 7A.
Figure 7D:
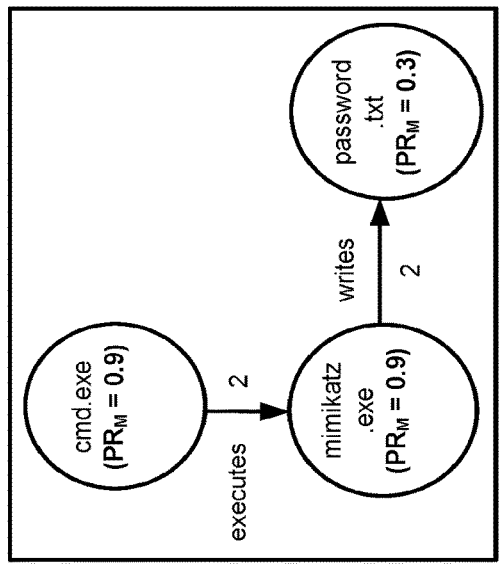
Figure 7E:
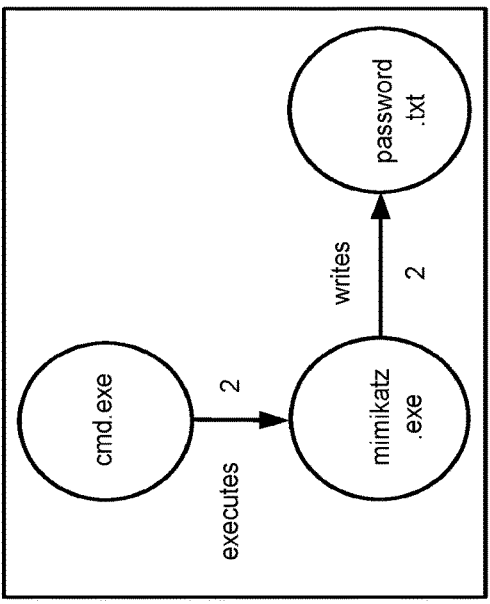
Figure 7F:
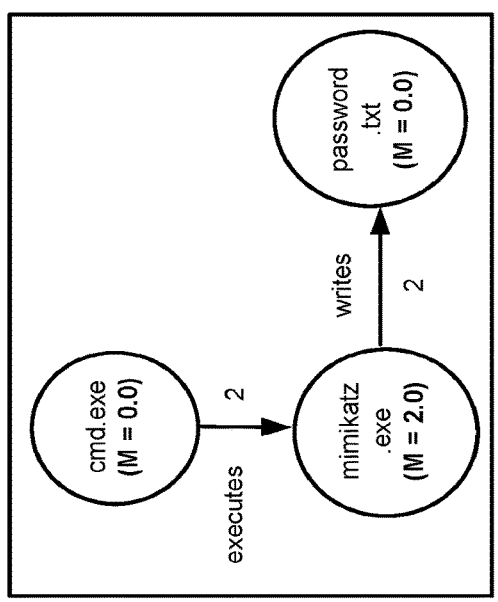
Figure 7G:
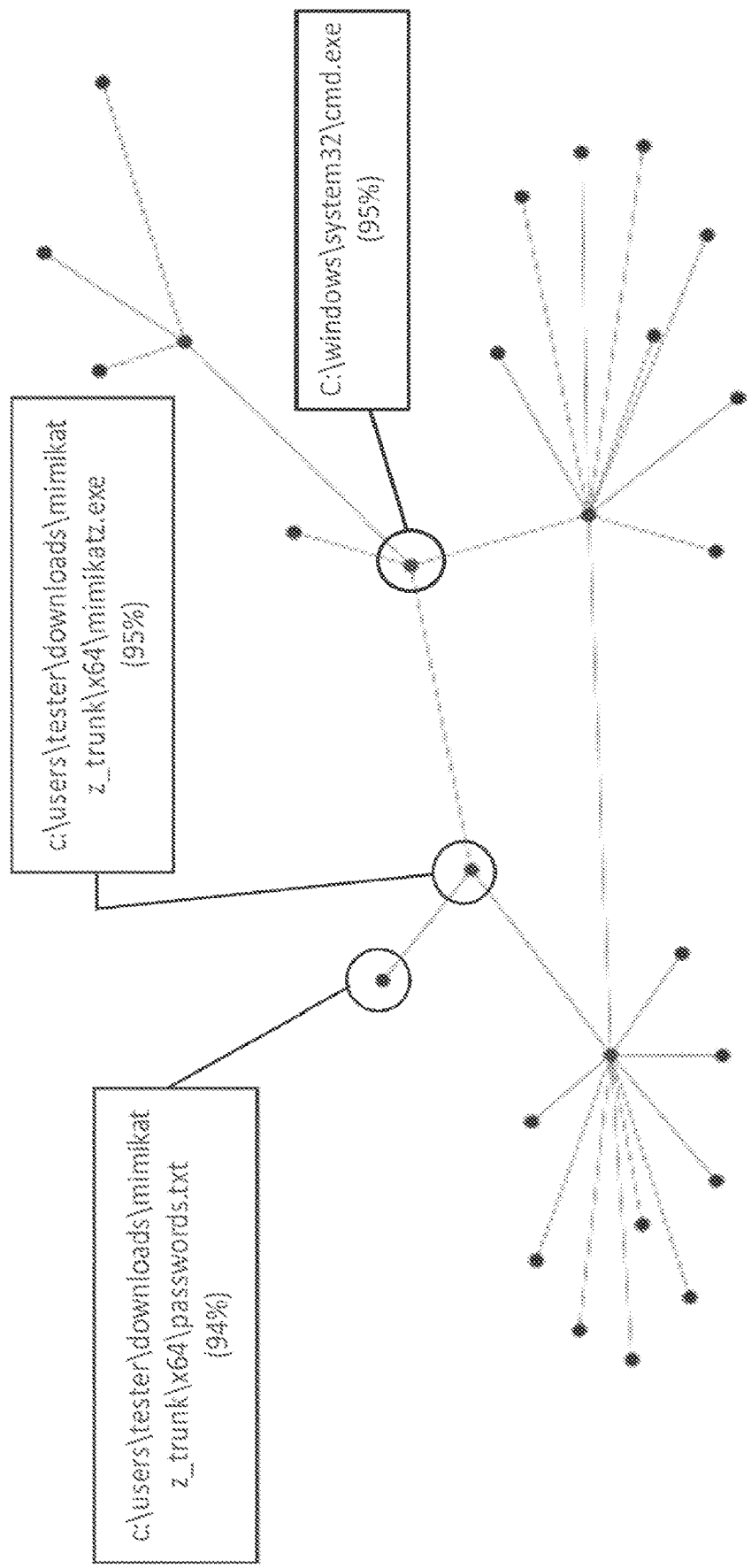
FIGS. 7G-7I show relationships between the excerpts of FIGS. 7C-7F and the subgraph of FIG. 7B.
Figure 7H:
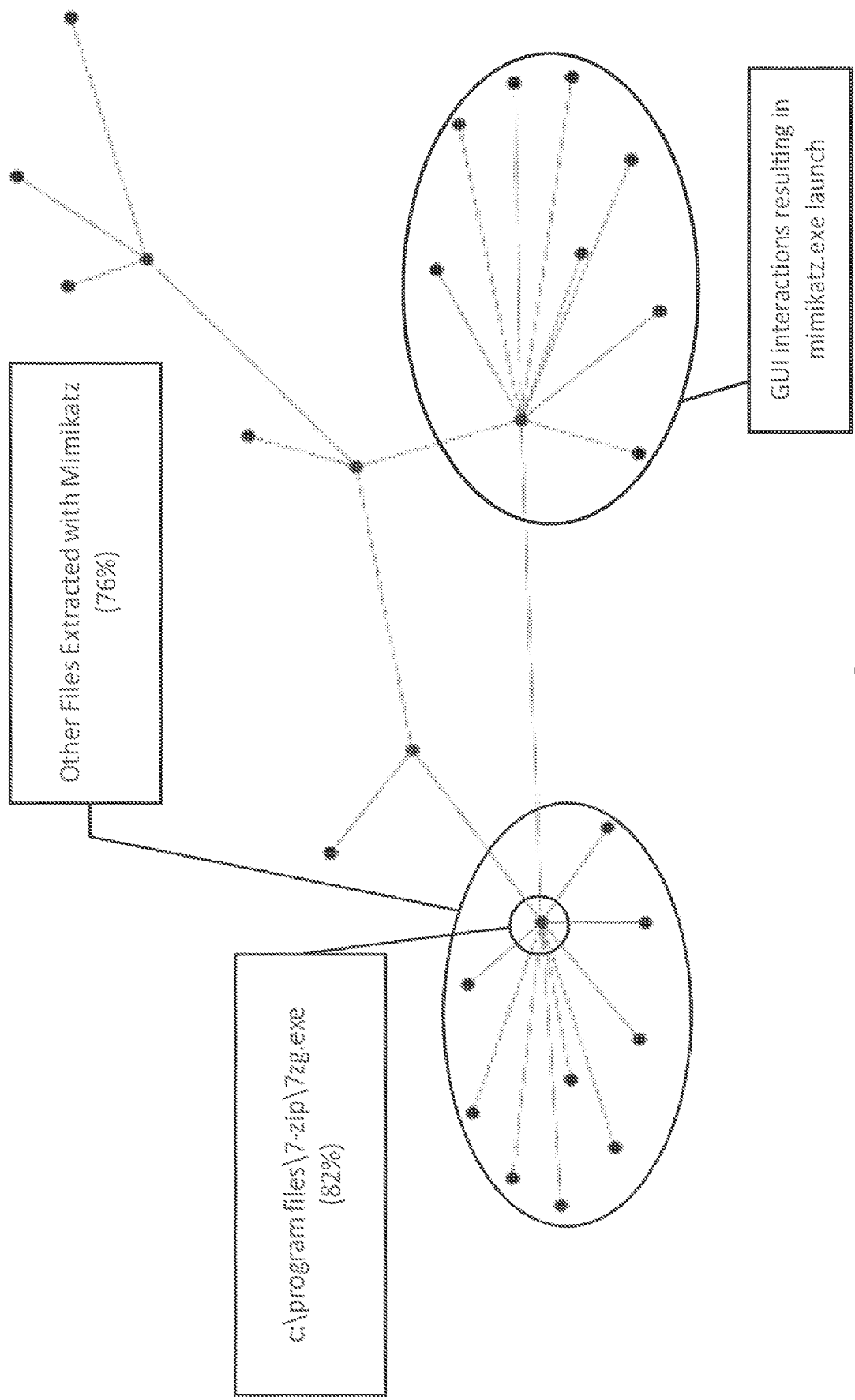
Figure 7I:
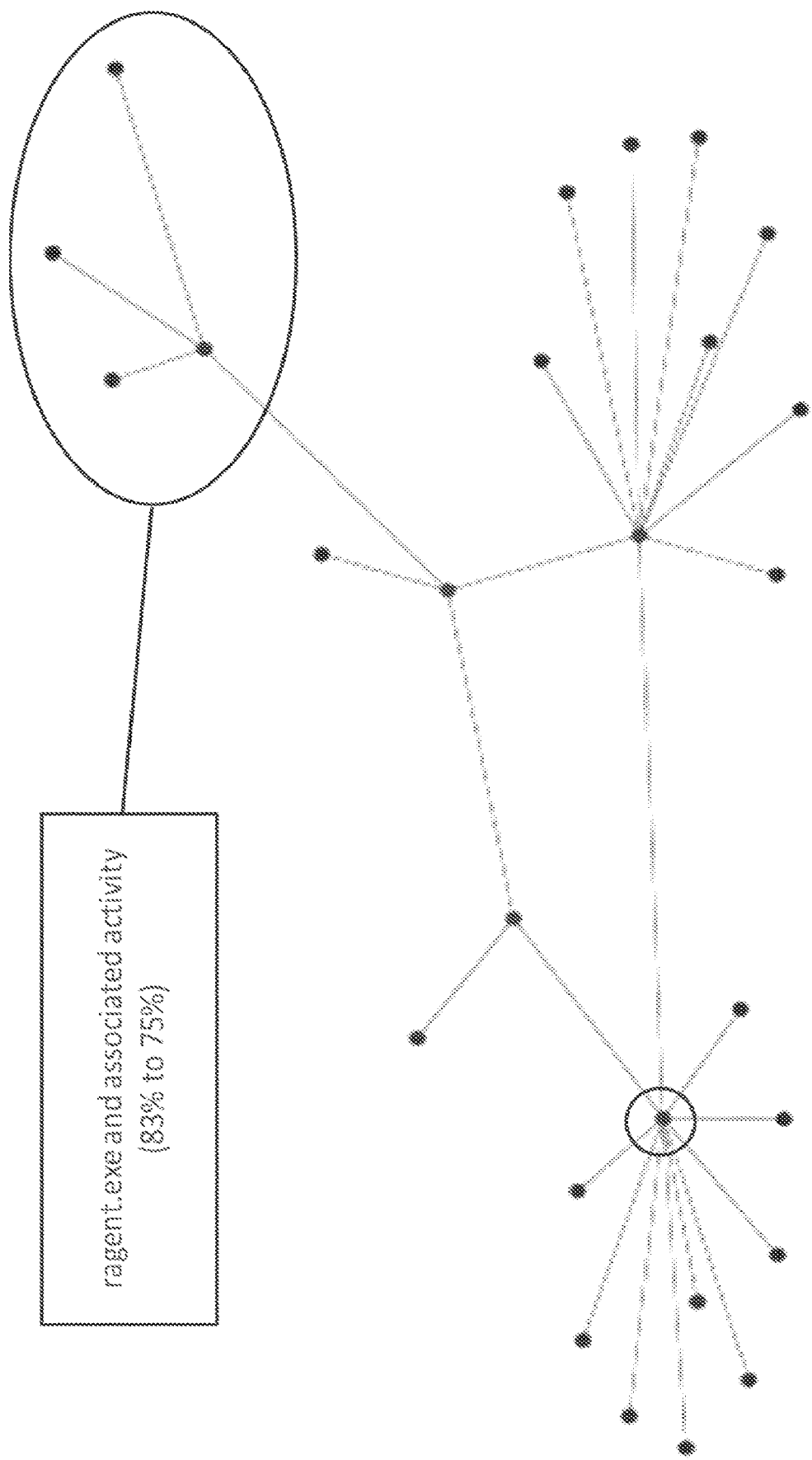
Figure 8:
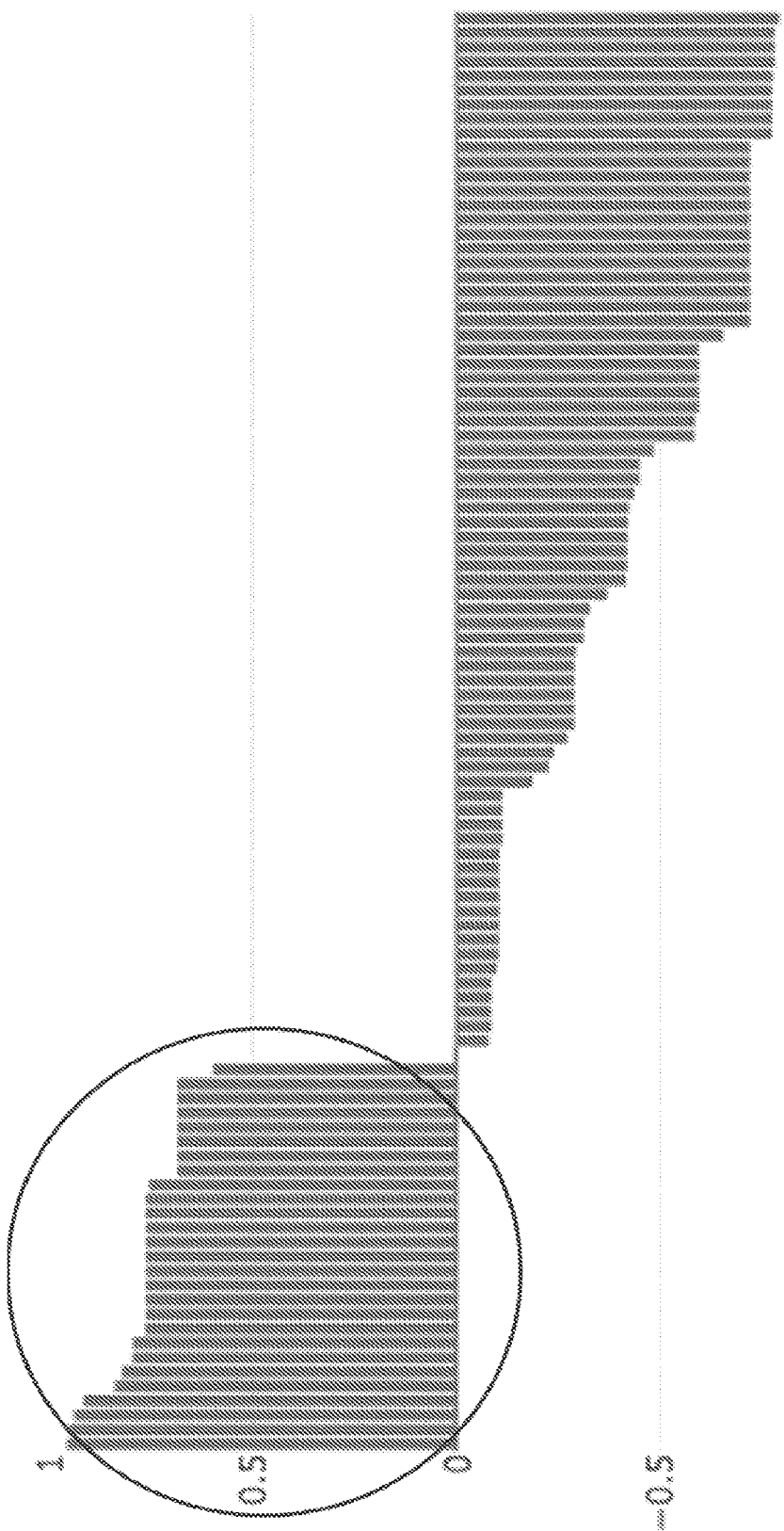
FIG. 8 is a bar chart showing the extraction of a malicious behavior, according to an embodiment.

FIG. 7B shows an example subgraph of the semantic graph of FIG. 7A. The subgraph can correspond to a region within the semantic graph that is of particular interest (e.g., in a cyber-security sense), for example as determined based on threat scores of the objects/nodes (e.g., the associated normalized modified threat scores exceeding a predetermined threshold) and/or based on logged event data. The subgraph can include a substantially smaller number of objects/nodes and events/edges than that of the semantic graph of FIG. 7A (in this case, FIG. 7B includes 27 nodes and 28 edges), such that the subgraph, when rendered within a GUI, focuses the user/analyst's attention on a critical region of the monitored system. Moreover, because the data being rendered, represented, and updated within the subgraph is less than that of the full semantic graph, the processing efficiency is greater, the processing speed is faster, the memory/storage requirements are reduced, and the probability that the analyst will see, and take action to mitigate against, a cyber-threat can be dramatically increased. The generation of the subgraph can be automatic by the processor, e.g., in response to the detection of a parameter or value (e.g., an average threat score, or a threat score gradient) exceeding a predetermined/pre-specified threshold value. FIGS. 7C-7F are diagrams showing an evolution of an excerpt of the semantic graph of FIG. 7A, as explained above with reference to FIG. 3. FIGS. 7G-7I show relationships between the excerpts of FIGS. 7C-7F and the subgraph of FIG. 7B. The percentages shown for the objects/nodes in FIGS. 7G-7I refer to the normalized PageRank change (or change in normalized threat score), which reflects the proportion of the current PageRank (or the modified threat score) that is due to a change from a baseline PageRank (or initial threat score). The lower right-hand portion of FIG. 7H shows the GUI interactions made by a user when launching mimikatz.exe (e.g., including double-clicking or otherwise selecting cmd.exe, causing it to run the program). FIG. 8 is a bar chart showing the normalized PageRank change score for all nodes. FIG. 8 shows the overall density of alerts and the connectivity of the semantic graph resulting from the threat score propagation described herein. As shown in FIG. 8, there is a clearly-identifiable drop-off in scores for objects unrelated to or unaffected by a particular alert (e.g., mimikatz.exe, in this example), which facilitates the selection of objects/nodes and events/edges for inclusion in a subgraph for presentation to an analyst. In other words, the normalized PageRank change scores within the circled region may be deemed relevant and used to generate the subgraph that will subsequently be displayed to a user via the GUI, and the normalized PageRank change scores not within the circled region are not used to generate the subgraph.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

The systems and methods described herein, may find applicability in other domains beyond cyber-security, for example, network traffic analysis. In some embodiments, the system and methods described may be used to circumvent anonymity techniques, and/or to determine associations between communicating nodes (e.g., evince a "management chain", identify related communications, etc.) of a nodal graph. By surfacing information related to such monitored systems (e.g., nodes), certain relationships may be identified, the recognition of such relationships being desirable for network management. For example, the system and method may be used to provide a network administrator or analyst with insights regarding inventory of computing devices connected to the monitored network, changes in the inventory over time, traffic workload, shaping and congestion, and other network characteristics. By generating a semantic graph associating the monitored entities with monitored relationships, and analyzing the semantic graph, the system and method may identify a subgraph of the semantic graph associated with a reportable profile for tuning performance of and otherwise managing the monitored network.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, solid state storage devices, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. A network traffic analysis method comprising:
   storing, in a memory, a semantic graph associated with a plurality of monitored computer-based entities and a plurality of monitored relationships, the semantic graph including a plurality of nodes and a plurality of edges, each node from the plurality of nodes representing a monitored computer-based entity from the plurality of monitored computer-based entities, each edge from the plurality of edges representing a monitored relationship from the plurality of monitored relationships and having an associated tally that updates in response to additional instances of an event associated with that edge;
updating, via a processor operably coupled to the memory, the semantic graph in response to receiving event data, the updating including:
modifying an alert attribute of a first monitored computer-based entity from the plurality of monitored computer-based entities when the event data includes an alert received from a source, the alert applicable to the first monitored computer-based entity,
decomposing the event data into a set of objects and a set of events, and updating the tally associated with an edge from the plurality of edges, based on the set of events and the set of one or more modified threat scores, to generate an updated semantic graph; and
monitoring the updated semantic graph for one or more reportable profiles for tuning performance or managing the plurality of monitored computer-based entities.

2. The method of claim 1, wherein decomposing the event data into a set of objects and a set of events comprises: each object of the set of objects being represented as a node and each event of the set of events being represented as an edge.

3. The method of claim 1, wherein updating the semantic graph in response to receiving the event data comprising: updating the tally associated with an edge of the plurality of edges, based on a set of relationships among the set of entities, to (i) generate an updated semantic graph, or (ii) add at least one of a new node or new edge to the semantic graph.

4. The method of claim 1, wherein the monitoring the managing the plurality of monitored computer-based entities comprises at least one of (i) analyzing changes in inventory of computer devices represented by the set of objects, (ii) analyzing traffic workload of the computer-based entity, or (iii) shaping and congestion of the computer-based entity.

5. The method of claim 1, wherein modifying the alert attribute of the first monitored computer-based entity from the plurality of monitored computer-based entities comprises:
receiving a second alert data;
incrementing a number of occurrences associated with at least one relationship represented by a plurality of edges in the semantic graph to produce an incremented number of occurrences; and
sending a signal, in response to incrementing the number of occurrences, to cause display of a modified subgraph reflecting the incremented number of occurrences.

6. The method of claim 1, wherein the updating the semantic graph comprises:
updating the semantic graph in response to detection, over time, of at least one of: a new entity, a new event, or a new alert.

7. The method of claim 1, wherein managing the plurality of monitored computer-based entities comprises identifying a related communication based on at least one edge between at least a first node and a second node.

8. The method of claim 1, wherein managing the plurality of monitored computer-based entities comprises circumventing an anonymity technique.

9. The method of claim 1, wherein the event data comprises at least one of an observed network traffic characteristic for a network monitored by an SOC or data associated with a processing activity monitored by the SOC.

10. The method of claim 1, wherein the semantic graph is a representation between network elements monitored by an SOC.

11. A network traffic analysis apparatus, comprising:
a compute device including a processor and a memory storing instructions that, when executed by the processor, cause the processor to:
send a signal to cause display, via a GUI, of a semantic graph, the semantic graph including a plurality of nodes and a plurality of edges, each node from the plurality of nodes representing an entity from a plurality of entities, each edge from the plurality of edges representing an event from a plurality of events and having an associated tally that updates in response to additional instances of the event associated with that edge;
update the semantic graph in the memory, in response to receiving event data, by:
updating the tally associated with an edge from the plurality of edges, based on the event data, and
modifying a score of each entity from the plurality of entities based on the event data, to define a plurality of modified scores;
detecting, subsequent to the display of the semantic graph, a subgraph of the semantic graph based on the plurality of modified scores; and
sending a signal to cause display, via the GUI, of the subgraph, in a manner to distinguish the subgraph from a remaining portion of the semantic graph.

12. The network traffic analysis apparatus of claim 11, wherein the signal to cause display, via the GUI, of the subgraph does not cause display of the remaining portion of the semantic graph.

13. The network traffic analysis apparatus of claim 11, wherein the event data includes at least one of an observed characteristic for a network monitored by a security operations center (SOC) or data associated with a processing activity monitored by the SOC.

14. The network traffic analysis apparatus of claim 11, further comprising updating the semantic graph in response to detection, over time, of at least one of: a new entity, a new event, or an alert.

15. The network traffic analysis apparatus of claim 11, wherein the semantic graph is a representation of a relationship between network elements monitored by a security operations center (SOC).

16. The network traffic analysis apparatus of claim 11, wherein each entity from the plurality of entities represents a compute device within a network monitored by a security operations center (SOC).

17. The network traffic analysis apparatus of claim 11, wherein the modified score comprises a threat score.

18. A non-transitory processor-readable medium storing code representing instructions to cause a processor to:
send a signal to cause display, via a GUI, of a semantic graph, the semantic graph including a plurality of nodes and a plurality of edges, each node from the plurality of nodes representing an entity from a plurality of entities, each edge from the plurality of edges representing an event from a plurality of events and having an associated tally that updates in response to additional instances of the event associated with that edge;
update the semantic graph in a memory, in response to receiving event data, by:
updating the tally associated with an edge from the plurality of edges, based on the event data, and
modifying a score of each entity from the plurality of entities based on the event data, to define a plurality of modified scores;
detecting, subsequent to the display of the semantic graph, a subgraph of the semantic graph based on the plurality of modified scores; and sending a signal to cause display, via the GUI, of the subgraph, in a manner to distinguish the subgraph from a remaining portion of the semantic graph.

19. The non-transitory processor-readable medium of claim 18, wherein the signal to cause display, via the GUI, of the subgraph does not cause display of the remaining portion of the semantic graph.

20. The non-transitory processor-readable medium of claim 18, further comprising updating the semantic graph in response to detection, over time, of at least one of: a new entity, a new event, or an alert.

* * * * *